Sept. 8, 1959     T. A. SAULNIER, JR     2,903,377
METHOD OF APPLYING FILMS TO CATHODE RAY TUBE SCREENS
Filed Oct. 13, 1955
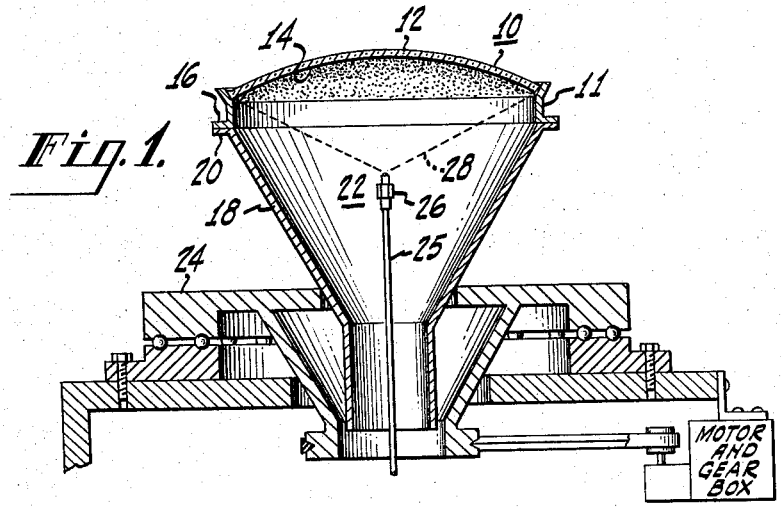
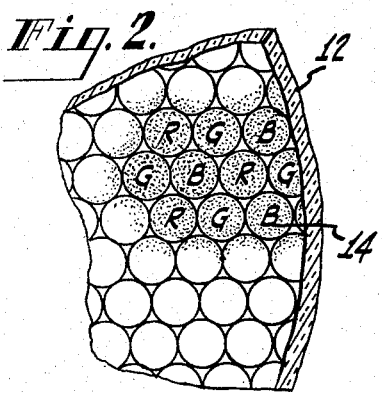
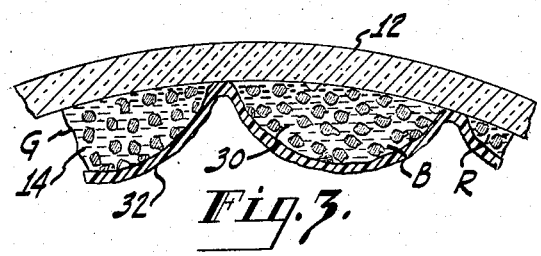
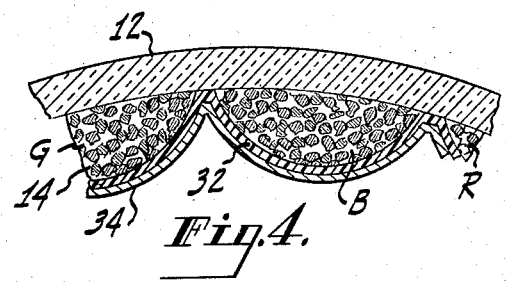
INVENTOR.
THEODORE A. SAULNIER, JR.
BY
William A. Zalesak
ATTORNEY

United States Patent Office 2,903,377
Patented Sept. 8, 1959

2,903,377

METHOD OF APPLYING FILMS TO CATHODE RAY TUBE SCREENS

Theodore A. Saulnier, Jr., Lancaster County, Pa., assignor to Radio Corporation of America, a corporation of Delaware Application October 13, 1955, Serial No. 540,285

11 Claims. (Cl. 117—33.5)

This invention relates to the art of applying films to cathode ray tube screens, and particularly to improvements in applying a light reflective surface, such as thin metallic backing to fluorescent phosphor screens.

It is a common practice to provide the fluorescent phosphor screen of a cathode ray tube or television picture tube with a thin metallic backing, such as aluminum, which is electron-pervious, and whose surface in contact with the phosphor screen has a mirror-like finish for reflecting towards the viewer any light emitted from the screen in the direction of the tube interior. The various techniques for applying the metallic backing or layer involve first forming on the phosphor screen a film of lacquer or resin having a bright surface, applying the metallic layer to the bright surface of the lacquer film, and then baking out the lacquer film to remove the same.

Various methods have been devised for applying the lacquer film. In the so-called "flotation" method of lacquer filming, the phosphor surface is covered with a water pool on which the lacquer film is deposited and floated into position over the phosphor screen. Afterwards, the water pool is removed to permit the lacquer film resting on its surface to settle into position and adhere to the rough phosphor surface.

In another method of lacquer filming, the phosphor surface is provided with a liquid substrate or filling liquid such as water, of sufficient depth to just cover the peaks of the phosphor crystals. Thereafter, the lacquer film is applied by spraying or swirling a lacquer solution over the wet phosphor surface, and the substrate is allowed to dry while the lacquer film is hardening and stretching into place.

Heretofore, there has been no attempt to control the physical properties of the liquid substrate, whether it be the pool of water, or simply the filling liquid, also water, which fills the interstices between the phosphor crystals. Consequently, one is beset by many difficulties in attempting to lay down a lacquer film which is mirror-smooth and free from defects such as rough or dull spots, holes, and tears. Some of the reasons for these defects are premature draining or drying of the liquid substrate from the interstices of the phosphor crystals before the lacquer film has hardened sufficiently to prevent its penetration into the interstices between the phosphor crystals of the screen. Another reason is the inadequacy of the liquid substrate to thoroughly wet the phosphor screen and to form a coherent film which presents a barrier against breakthrough by the sprayed or poured lacquer, or the floated lacquer film.

An object of this invention is to provide an improved method of applying a smooth resinous film to a rough phosphor surface.

Another object is to provide an improved method of applying a smooth lacquer film to a phosphor surface, which lacquer film is substantially free from rough areas, holes, and other defects which impair its mirror-like finish.

Another object is to provide an improved method of applying a mirror-smooth light reflecting surface to a phosphor screen.

These and other objects are achieved in accordance with the invention by utilizing as a liquid substrate upon which the resinous lacquer film is to be formed, a substance having increased ability to wet and to adhere to a phosphor screen, having improved film-forming properties, and having a viscosity such that the drainage from the interstices of the phosphor crystals and the drying of the substance is retarded. In a preferred embodiment of the invention, the liquid substrate used comprises an aqueous colloidal film of polyvinyl alcohol and methyl alcohol.

The invention is applicable to phosphor screens comprising substantially a single, large body of phosphor material, as in black and white television picture tubes. It is also applicable to tri-color phosphor screens, which are made up generally of discrete elements, such as lines, dots, or the like, of phosphor material disposed on a light transparent foundation or base plate, as in color television picture tubes. The invention is described in greater detail in connection with the application of films to tri-color phosphor screens.

In the drawings:

Fig. 1 is a schematic drawing showing a cathode ray tube having a tri-color phosphor screen, and apparatus for applying a liquid substrate to the phosphor screen of the tube according to the invention;

Fig. 2 is a fragmentary schematic view of the cathode ray screen of Fig. 1;

Fig. 3 is a fragmentary view in section of the cathode ray tube screen of Fig. 1 as viewed during one step of its formation according to the invention; and Fig. 4 is a view of the cathode ray tube screen of Fig. 3 as viewed during a later step of its formation.

Referring to Fig. 1, there is shown a cap portion 10 which is to become the front end of a tri-color cathode ray receiving tube. The cap portion 10 includes a metallic rim 11 and a transparent face plate 12, made of glass, for example, sealed to rim 11. Face plate 12 is shown as constituting a portion of a sphere, but may, however, have a cylindrical or flat contour and may be circular or rectangular in shape. The rim 11 of the cap portion 10 is provided with an annular metallic flange 16.

The cap portion 10 is attached during the screen filming process to a funnel-shaped member 18, which simulates the flared or conical portion of the finished tube. The large end of the funnel-shaped member 18 is similarly provided with an annular metallic flange 20. The two complementary flanges 16 and 20 are clamped together by suitable means, not shown, to effect the attachment between the cap portion 10 and the funnel-shaped member 18 and form a bulb assembly 22.

If used for a color television picture tube, the inside surface of the face plate 12 bears a mosaic phosphor screen 14. As shown more clearly in Fig. 2, the mosaic screen 14 comprises a multiplicity (usually 300,000 or more) of triads (i.e. groups-of-three) of red (R), blue (B) and green (G) fluorescing phosphor dots. The phosphor dots are here arranged in a hexagonal pattern, that is to say, each dot is surrounded by six other dots, alternate ones of said other dots being of a second color-response characteristic, and the intermediate ones of said dots exhibiting a third color-response characteristic.

Referring again to Fig. 1, the bulb assembly 22 is supported in an upright position by a rotatable chuck 24. A spray pipe 25 terminating in a nozzle 26 extends within the bulb assembly 22 with the nozzle 26 occupying a central position therein.

In carrying out the invention, the phosphor screen 14 is first provided with a viscosity controlled liquid substrate. The purpose of the substrate is to provide a barrier layer, which fills the interstices between the phosphor crystals, so that a lacquer film can subsequently be applied over the peaks of the phosphor crystals without penetrating into the interstices between the phosphor crystals.

For manufacturing convenience, the liquid substrate is preferably applied as a spray 28 while the bulb assembly 22 rotates. For best results in applying the spray 28, the nozzle 26 is of the type known as a "fog nozzle," in which the liquid supplied under pressure to the nozzle is mechanically atomized without the use of air atomization.

A preferred formulation for the liquid substrate as applied by the spray method appears in Table I below:

Table I

| | Percent by weight |
|---|---|
| Du Pont 51–05 Elvanol (polyvinyl alcohol solids) | ½ |
| Methyl alcohol | 40 |
| Water | 59½ |

51–05 Elvanol has a hydrolysis of 86 to 89%, and a viscosity of 4 to 6 centipoises as determined with a 4% water solution at 20° C. by means of the Hoeppler falling ball method.

Satisfactory results have been achieved in filming a 21-inch color phosphor screen by first rotating the bulb assembly 22 at 50–65 r.p.m. The spray 28 is then introduced under a pressure of about 40 pounds per square inch gage pressure for about 15–20 seconds.

As shown schematically in Fig. 3, the spray 28 forms a viscosity controlled liquid substrate, or aqueous colloidal film 30, over the phosphor screen 14. The substrate 30 thoroughly wets the phosphor crystals of each color dot, filling the interstices of the crystals so as to follow the contours of the dots. Only so much spray 28 is needed as will cover the crystal peaks and keep them covered while a lacquer film 32 is later being applied over the phosphor screen 14. Uniform wetting of the entire phosphor screen and removal of any excess liquid substrate 30 is facilitated by allowing the bulb assembly 22 to continue rotating, sometimes called "spinning," for about 10 to 15 seconds.

Next a lacquer film 32 formed from a heat decomposable resin which is incompatible with the liquid substrate 30 is applied over the liquid substrate 30. The lacquer film 32 is insoluble in and chemically inert with respect to the liquid substrate 30. The lacquer film 32 is preferably applied by spraying the lacquer with a fog nozzle similar to the nozzle 26 used for spraying the liquid substrate 30. One type of lacquer solution which has been successfully used in applying the lacquer film 32 has the following composition by weights.

| | Percent |
|---|---|
| Isobutylmethacrylate polymer | 5.7 |
| Acryloid B–72 (100% solid) | 0.1 |
| Toluene | 94.2 |

Acryloid B–72 is an isobutyl ester of acrylic acid and a long polymer. The above formulation for the lacquer film 32 is not part of the present invention. For a nozzle having a flat spray angle of 80–110°, depending on nozzle choice, and a capacity of .05–0.10 gallon per minute, lacquer is delivered to the nozzle under a pressure of about 40 pounds per square inch for about 10–15 seconds while the bulb assembly 22 is rotated at about 50–65 revolutions per minute. About 50–70 cc. of lacquer solution is used for a 21 inch tube. The bulb assembly is allowed to continue rotating, or "spinning" for about 45 seconds to remove the excess lacquer to the sides of the bulb assembly 22 from which it is allowed to drip out.

Next, the bulb assembly 22 is removed and allowed to set with the viewing side of the phosphor screen 14 upright for further draining of the lacquer. The draining time is 8–15 minutes for a 21 inch tube. During this time, the lacquer film 32 partially hardens, but generally follows the contour of the rough phosphor surface as in Fig. 3.

With the phosphor screen 14 still wet with the liquid substrate 30 and the lacquer film 32, the screen 14 is dried with warm air at 50°–90° C. In an alternative drying process the cap portion 10 is allowed to stand for 10 minutes and then removed from the funnel-shaped member 18 and placed over a bank of infra-red lamps. The toluene first evaporates from the lacquer solution and the lacquer film 32 begins to shrink. A few minutes later the liquid substrate 30 evaporates through the lacquer film 32. When the drying is complete, the lacquer film 32 is completely shrunk and stretches smoothly across the peaks of the phosphor crystals, as shown in Fig. 4. Excess film around the edge of the cap is removed with a solvent swab dipped in acetone or amyl acetate or other suitable solvent. The surface of the lacquer film is then very smooth and hard and is ready for the application of a metallic backing 34, preferably aluminum.

In an alternative method, the liquid substrate 30 is applied to a color phosphor screen in a cap portion, or to a black and white phosphor screen in a bulb by pouring 50–80 cc. of the polyvinyl alcohol-methyl alcohol-water solution into the cap portion or bulb while tilting the cap portion or bulb in a manner to cause the solution to cover the entire phosphor screen. The excess substrate is poured out and a drainage time of 2 to 4 minutes is allowed for further draining of the excess substrate. The operation is repeated with the filming lacquer, followed by a standing time of 5 to 10 minutes to set the lacquer film 32. After setting the lacquer film 32, the lacquer film 32 and liquid substrate 30 are further dried by blowing air over the cap portion or into the bulb, or by infrared drying.

The application of the metallic backing 34 may be performed by any well-known method of aluminizing cathode ray tube phosphor screens. Briefly, one method consists of fixing short lengths of aluminum wire to a tungsten filament, and heating the filament in a vacuum, to a temperature sufficient to melt and evaporate the aluminum completely, and depositing the aluminum onto the smooth lacquer film 32 to form the metallic backing 34.

The lacquer film 32 is later baked out at about 400° C., leaving only the metallic backing 34 adhering to the phosphor screen 14.

In general, the purpose of the liquid substrate 30 is to prevent penetration of the lacquer film 32 into the interstices between the crystals of the phosphor screen 14, as indicated previously. Inasmuch as each dot of the phosphor screen 14 comprises many random-sized crystals of phosphor, the lacquer film 32, applied by spraying or otherwise, would flow into the interstices between the individual phosphor crystals, were it not for the presence of the liquid substrate 30. Hence, an excessive amount of lacquer film 32 would be required to form a mirror-smooth substrate on which to deposit the metallic backing 34 (Fig. 4). The excessive lacquer film 32 would be difficult to remove by baking.

In prior methods of filming, the lacquer film 32 has been applied over a water barrier layer without any attempt to control or modify the properties of the water barrier layer, sometimes referred to as the filming substrate. Consequently, the entire filming process has been very critical. Slight variations in screen thickness, glass contours, screen porosity, water temperature, room temperature, rate of "spinning," wettability of the screen, impingement of the lacquer, sprayed or sloshed on, and quantities of water or lacquer have seriously affected the results of the process. In filming, lack of control of the water layer has been a principal cause of film defects such as holes, tears, and dull spots. Many film defects have been directly or indirectly caused by excessive drainage of water from the phosphor screen before the lacquer film has set sufficiently, or by uncontrolled drying out of the water layer beneath the lacquer film. However, these defects are practically eliminated by utilizing a viscosity controlled liquid substrate 30 in accordance with the invention.

In addition to the preferred formulation of Table I, various other thickening agents may be used in an aqueous solution to control both the viscosity and drying time of the liquid substrate 28. Among these are various natural or synthetic organic hydrophilic colloids and polymers such as for example, gelatin, methylcellulose, sodium carboxymethylcellulose, various water soluble vinyl polymers, glue, and water soluble alginates. Viscosity and drying times can be further controlled by incorporating plasticizers and humectants in water together with, or in place of, the viscosity control agents. Such materials as glycerin and glycols would be applicable as plasticizers and humectants.

In addition to viscosity control and drying control, the addition of agents to increase the viscosity causes the solution to wet certain hydrophobic materials which may contaminate the phosphor screen. Where poor wetting may persist, the thickened water solution will often heal over small hydrophobic areas sufficiently to permit the formation of a continuous substrate for filming. This wetting and healing effect will permit the formation of a liquid substrate over photosensitized polyvinyl alcohol used as a binder in photodepositing the phosphor dots in the color phosphor screen 14.

In connection with the preferred formulation of Table I, it is pointed out the methyl alcohol is utilized to suppress the foaming properties of the water soluble resin (polyvinyl alcohol) as well as to improve its wetting properties. Ethyl alcohol and other compatible foam reducing liquids may be used in place of the methyl alcohol. In utilizing methods of application other than by spraying, as by pouring followed by sloshing or swirling, wherein foaming problems are minimized, the methyl alcohol or other foam repellent can be omitted. Although the particular proportions of the constituents specified in Table I have given optimum results for the particular processing schedule set forth above, a more general formula is given below in Table II as follows:

*Table II*

| | Percent by weight |
|---|---|
| Polyvinyl alcohol | .25 to 5 |
| Methyl alcohol | 10 to 50 |
| Water | Remainder |

Any particular formulation selected depends upon the method of application of the liquid substrate and the actual processing schedule. Higher viscosity type polyvinyl alcohols with higher or lower hydrolysis values than that given for the 51–05 Elvanol may be used with an adjustment in the processing schedule, such as a longer "spinning" time or faster "spinning" speed to remove the excess liquid substrate.

In conclusion, the viscosity controlled liquid substrate improves the filming process in one or more of the following ways. It increases the wetting and film-forming properties of the substrate. It increases the cohesion of the liquid substrate so that upon impingement of the sprayed or poured lacquer, the lacquer does not readily break through the substrate. The drainage and rate of the substrate is retarded so that the formation of the lacquer film and the drying thereof can take place with sufficient substrate to assure a bright film.

What is claimed is:

1. The method of applying a smooth resinous film to a phosphor surface within a bulb assembly, said method comprising applying by fine spray a solution of a polyvinyl alcohol, methyl alcohol, and water to form a substrate on said phosphor surface, applying on said substrate a film of a heat decomposable resin which is incompatible with said substrate, removing said substrate, and causing said film to solidify to a smooth finish.

2. The method of applying a smooth resinous film to a phosphor surface within a bulb assembly, said method comprising rotating said bulb assembly, introducing within said bulb assembly a spray of a solution including a polyvinyl alcohol, methyl alcohol, and water to form a substrate on said phosphor surface, spraying on said substrate a film of a heat decomposable resin which is incompatible with said substrate, removing said substrate, and drying said film to a hard smooth finish.

3. The method of applying a light reflective metallic backing to a phosphor screen, said method comprising applying a viscosity controlled liquid substrate on said phosphor surface, forming on said substrate a film of a heat decomposable resin which is incompatible with said substrate, removing solvent from said substrate, causing said film to harden and solidify to a smooth finish, depositing a light reflective metallic backing on said smooth film, and removing said film to leave said metallic backing in contact with said phosphor screen, said liquid substrate being formed from a solution including .25–5% by weight of polyvinyl alcohol, 10–50% by weight of methyl alcohol, and the remainder water.

4. The method of applying a light reflective metallic backing to a phosphor screen, said method comprising applying a viscosity controlled liquid substrate on said phosphor surface, forming on said substrate a film of a heat decomposable resin which is incompatible with said substrate, removing solvent from said substrate, causing said film to harden and solidify to a smooth finish, depositing a light reflective metallic backing on said smooth film, and removing said film to leave said metallic backing in contact with said phosphor screen, said liquid substrate being formed from a solution wherein the constituents are present in substantially the following proportions by weight:

| | Percent |
|---|---|
| Polyvinyl alcohol | ½ |
| Methyl alcohol | 40 |
| Water | 59½ |

5. The method of applying a light-reflective metallic backing layer to a phosphor screen, said method comprising applying a substrate of an aqueous solution of a first water-soluble resinous film-forming material on said phosphor surface to fill the interstices between phosphor particles, forming on said substrate a film of a heat decomposable organic material which is substantially insoluble in said substrate, depositing a light-reflective metallic backing on said smooth film, and removing substantially all of the organic materials from said screen to leave said metallic backing in contact with said phosphor screen.

6. The method of applying a light-reflective metallic backing layer to a phosphor screen, said method comprising applying a substrate of an aqueous solution of polyvinyl alcohol on said phosphor surface to fill the interstices between phosphor particles, forming on said substrate a film of a heat decomposable resin which is substantially insoluble in water, causing said film to harden and solidify to a smooth finish, depositing a light-reflective metallic backing on said smooth film, and removing substantially all of the organic materials from said screen to leave said metallic backing in contact with said phosphor screen.

7. The method of applying a light-reflective metallic backing layer to a phosphor screen, said method comprising applying a substrate of at least a 0.25 weight percent aqueous solution of polyvinyl alcohol on said phosphor surface to fill the interstices in the phosphor crystals, forming on said substrate a film of a heat decomposable resin which is substantially insoluble in said substrate, causing said film to harden and solidify to a smooth finish, depositing a light-reflective metallic backing on said smooth film, and removing substantially all of the organic materials on said screen to leave said metallic backing in contact with said phosphor screen.

8. The method of claim 7 wherein said polyvinyl alcohol solution includes polyvinyl alcohol in the range of 0.25 to 5 weight percent.

9. The method of claim 7 wherein said film includes isobutylmethacrylate.

10. The method of applying a light-reflective metallic layer to a phosphor screen, said method comprising applying on said phosphor surface a substrate of an aqueous solution of a water soluble polymeric film-forming material, forming on said substrate a film of a heat decomposable resin which is substantially insoluble in said substrate, depositing a light reflective metallic layer on said film, and removing said film and said substrate to leave said metallic layer in contact with said phosphor screen.

11. The method of applying a smooth resinous film to a phosphor surface, said method comprising applying a film, formed from an aqueous colloidal solution, having a viscosity greater than water, over said phosphor surface, forming on said film a second film of a heat decomposable resin, which is incompatible with said aqueous film, removing said aqueous film and causing said second film to harden and solidify to a smooth finish.

References Cited in the file of this patent

UNITED STATES PATENTS

| | | |
|---|---|---|
| 2,644,770 | Sadowsky | July 7, 1953 |
| 2,695,892 | Jaccard et al. | Nov. 30, 1954 |

OTHER REFERENCES

Technical Data Bulletin, Du Pont No. 5, 440, page 2.